P. W. PRATT.
BUFFER-STEM.
No. 170,190. Patented Nov. 23, 1875.
Fig:1.
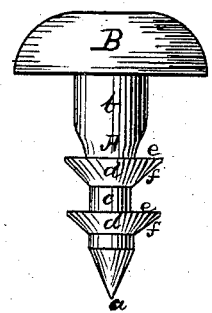
Fig:2.
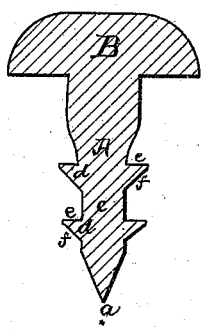
Witnesses:
Henry Eichling
Fred E Bond
Inventor:
Philip W. Pratt.
By Fitch & Fitch
His Attys.

UNITED STATES PATENT OFFICE.

PHILIP W. PRATT, OF ABINGTON, MASSACHUSETTS.

IMPROVEMENT IN BUFFER-STEMS.

Specification forming part of Letters Patent No. 170,190, dated November 23, 1875; application filed October 11, 1875.

*To all whom it may concern:*

Be it known that I, PHILIP W. PRATT, of Abington, county of Plymouth and State of Massachusetts, have invented an Improved Rubber Peg or Buffer-Stem, of which the following is a specification, reference being had to the accompanying drawings forming part hereof.

My invention consists, as a new article of manufacture, in an india-rubber peg or buffer-stem, which is preferably pointed at one end, and has upon its shank one or more projecting rings or protuberances forming part of the rubber body of the stem, of the form hereinafter particularly described, whereby the peg cannot escape from any orifice in which it is snugly fitted.

Figure 1 is a side elevation of my peg or buffer stem with a buffer-head attached. Fig. 2 is a longitudinal central sectional view of the same.

A is the rubber buffer stem or peg, preferably having the pointed end $a$, so that it may readily enter any opening or orifice, and formed with the thick butt-end $b$, as shown. Upon the narrow shank part $c$ are formed one or more projecting flanges or protuberances, $d$, which are a part of the body of the shank, and which are made with the face $e$ nearest the butt $b$ perpendicular to the axis of the shank, and with the face $f$ beveled or sloping from the rim of the flange to the body of the shank, as shown.

The stem or peg shown in the drawings is cylindrical in form; but it may be made with four or any desired number of sides to suit the orifice in which it is to be placed, the flanges $d$ being made to conform to the shape of the stem without essentially changing the nature of my invention.

The peg or stem may be driven into any opening or orifice, and will be firmly retained therein by the flanges $d$, the face $e$ of which will bind tightly against the walls of the orifice on any attempt at its escape, while the beveled or sloping face $f$ will act as a brace to the said face $e$. When once snugly embedded in any orifice, the stem can only be forcibly removed by tearing away or forcing backward upon the shank the flanges $d$.

The peg or stem may be used to fill any desired opening, or to join two surfaces or substances together; or it may be formed with a rubber buffer-head, B, as shown, and be thus adapted to hold the buffer firmly in position in any desired place—as, for instance, the lower end of a chair-leg—or two or more stems may be joined to a single buffer-head, and thus serve to join together two or more substances at any desired angle with an elastic cushion between them.

What I claim as my invention, and desire to secure by Letters Patent, is—

As a new article of manufacture, the rubber peg or buffer-stem A, provided with one or more projecting flanges, $d$, having the face $e$ perpendicular to the axis of the stem, and the face $f$ beveled or sloping from the rim of the flange to the body of the stem, as described, and for the purpose specified.

PHILIP W. PRATT.

Witnesses:
W. W. WILKINS,
GEO. W. WALES.